May 13, 1952 G. I. WAHNISH 2,596,627
GLARE PREVENTION DEVICE FOR AUTOMOBILES
Filed April 16, 1949
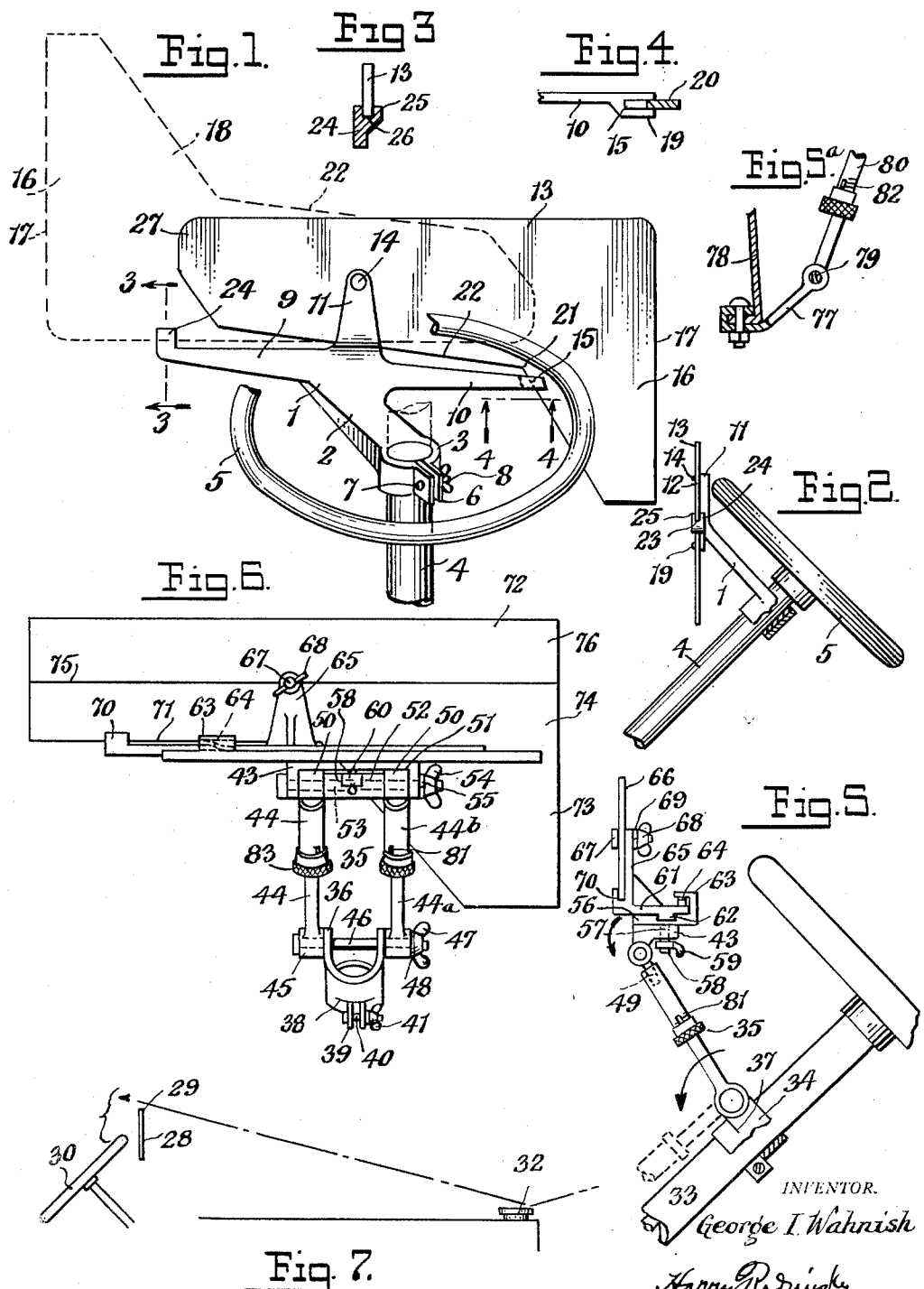
INVENTOR.
George I. Wahnish
BY Harry Radzinsky
ATTORNEY Patented May 13, 1952

2,596,627

UNITED STATES PATENT OFFICE 2,596,627

GLARE PREVENTION DEVICE FOR AUTOMOBILES

George I. Wahnish, Los Angeles, Calif.

Application April 16, 1949, Serial No. 87,871

3 Claims. (Cl. 296—97)

This invention relates to an automobile accessory, the function of which is to eliminate glare from light that passes to the driver's eyes from highly polished surfaces carried by or associated with the forward portion of the automobile that he is driving. Every automobilist has experienced the inconvenience of having a brightly polished radiator cap, or highly reflective surface of the hood, subjecting his eyes to strain. This discomfort is experienced largely by automobilists who drive their cars along roadways where they must drive toward the east in the morning, and toward the west in the afternoon, with the sun near the horizon so that the reflections from polished surfaces such as referred to, are relatively intense.

In addition to the reflection of sunlight from automobile hoods, or highly reflective radiator caps, it is also a fact that during night driving, automobile drivers are inconvenienced and endangered by glare from lamps of passing cars. It is a fact that many accidents are due to glare of headlights, which is sometimes so great as to prevent the driver of an oncoming car, from seeing another car to the right of a car that has unusually bright lamps.

One of the objects of this invention is to provide an attachment of simple construction, capable of eliminating the glare from reflected sunlight in rays that pass directly over the upper edge of the steering wheel.

A further object of the invention is to provide means for accomplishing the above stated objects, and at the same time to provide a construction which will enable the same glare-shield to function as an eliminator of the glare from the lamps from passing cars.

A further object of the invention is to provide a device of this character, that can be readily attached to the steering column, or adjacent thereto and which, by this means, attains adjustability as to the distance that the upper edge of the screen can project above the upper edge of the steering wheel.

In its preferred embodiment, the screen is mounted for rotation about a substantially horizontal axis, and one of the objects of the invention is to provide features of construction for the supporting bracket, which will enable it to support the screen in one position where it will eliminate reflected rays from the hood, and in a second position where it will operate to eliminate glare from the headlights of passing cars. In accomplishing this, the supporting bracket for the screen presents two rests or ledges to engage the screen panel from the rear side, and one of the objects of the invention is to provide a location for these ledges or rests, that will not interfere with the free rotation of the screen panel into its inverted position when shifting the screen panel from its normal sunlight glare-eliminating position, to a second position where it will screen out the glare from headlights.

Further objects of the invention will appear hereinafter.

In the drawings, wherein an illustrative embodiment of the invention is shown, Fig. 1 is an elevation illustrating an embodiment of the invention applied to the steering column of an automobile, showing the outline of the steering wheel, and omitting its spokes; and also shows a portion of the wheel broken away to prevent it from obstructing the outline of the bracket that supports the screen. In this view the screen panel is shown in full lines in the position in which it eliminates reflected rays from the hood of the car, and is shown in dotted outline in the position it assumes when set to eliminate headlight glare from passing cars. Also in this view the lower portion of the steering column is illustrated in full lines, and above the position of the bracket the upper portion of the steering column is shown in dotted outline.

Fig. 2 is a side elevation of the upper portion of the steering column, the steering wheel, and the embodiment of my invention secured to the steering column. In this view a portion of the sleeve of the bracket that is secured to the steering column, is broken away and shown partially in cross-section.

Fig. 3 is a fragmentary view, and is a vertical section taken on the line 3—3 of Fig. 1, and particularly illustrating the shelf or rest that supports the screen panel when it is in the position in which it will eliminate a glare from lamps on approaching cars.

Fig. 4 is also a section, but is in a horizontal plane taken about on the line 4—4 of Fig. 1, and looking upwardly.

Fig. 5 is a view similar to Fig. 2, but illustrating another embodiment of the invention that enables the screen to be shifted laterally and adjusted about axes of revolution. In this view the lower portion of the steering wheel and the steering column, are broken away.

Fig. 5a is a fragmentary view showing a portion of the dash in vertical section, and illustrating how the supporting means for the screen can be attached to a fixed point on the car body instead of anchoring it on the steering column as illustrated in Fig. 5.

Fig. 6 is an elevation showing the parts illustrated in Fig. 5 as viewed from the rear, but omitting the steering column and the steering wheel.

Fig. 7 is a diagrammatic view illustrating the operation of the screen in preventing reflected light rays from passing to the eyes of the driver of the car, seated behind the steering wheel.

In the drawing is shown a bracket 1 which has an arm 2 at one end of which a split sleeve 3 is formed, that is adapted to be secured to the steering column 4, just below the steering wheel 5. The split ring or sleeve 3 may be formed with two outwardly projecting ears 6 through which a bolt or screw 7 may be passed, one end of which is provided with a wing nut 8 for tightening up the sleeve. The arm 2 preferably extends upwardly and in a lateral direction so as to support two arms 9 and 10 that extend in opposite directions, that is to say, the arm 9 extends over toward the left, and the arm 10 extends over toward the right, as viewed in Fig. 1.

The arm 9 preferably extends in a substantially horizontal direction, while the arm 10 inclines slightly downwardly toward its tip for a reason that will appear hereinafter. The arms 9 and 10 stem off from an upwardly extending arm 11, the forward face 12 of which is preferably disposed in a substantially vertical plane.

On the bracket 1 is mounted a screen 13 which is preferably formed of a thin, transparent sheet material, preferably a suitable plastic, having sufficient color to subdue or eliminate the glare from light passing through the screen.

The bracket 1 is provided with suitable means for supporting the screen 13 so that the upper edge of the screen projects a considerable distance above the upper edge of the wheel.

The means for mounting the screen on the bracket, however, is preferably constructed so that the screen can be shifted toward the left. By doing this, the screen is enabled to function in two positions as described above. In Fig. 1 the screen is shown in full lines in the position in which it is used in daylight to reduce or "kill" the glare of reflected sun's rays emanating from the hood of the car carrying this accessory, or from the body of a car just ahead in the roadway.

The screen 13 is preferably supported to swing on a substantially horizontal axis at the upper end of the arm 11. For this purpose I may employ a pin or rivet 14 that fastens the screen 13 rotatably on the forward side of the arm 11.

As illustrated in Fig. 1, the arm 11 is preferably displaced a considerable distance laterally from the fore-and-aft vertical plane passing through the axis of the steering column 4. By placing the pivot pin 14 in this position there will be more of the material forming the screen 13, on the right-hand side of the pivot as viewed in Fig. 1, than on the left-hand side. Hence, the action of gravity on the panel when in this position, would develop a clockwise rotation in the panel about its axis. In order to support the panel in this position, I provide a ledge or rest 15 on the arm 10 that engages under the lower edge of the screen and supports it.

The lower edge of the screen is preferably not horizontal if the screen is intended to be used to perform the function of eliminating lamp glare of passing cars. In order to adapt the screen for this purpose, I prefer to provide its right end as illustrated in Fig. 1, with a downward extension 16, having a substantially vertical edge 17 extending substantially at right angles to the upper, horizontal edge of the screen. This extension may be called a flat "horn" as it is tapered in form so as to present an inner, inclined edge 18, which edge is the one that is supported on the rest 15. Referring again to the rest 15, it will be noted, as illustrated in Fig. 4, that this rest is produced by employing an offset extension or finger 19 that is disposed away from the plane of the arm 10 so as to form a small rectangular socket 20 into which the edge 18 can seat. The point at which the ledge or socket 20 is located on the edge 18, is near the vertex of a re-entrant angle 21 from which an inclined edge 22 extends over in a general horizontal direction toward the other side of the bracket.

In order to support the screen 13 in the position in which it is illustrated in dotted lines in Fig. 1, I provide a socket 23 formed between two upwardly projecting fingers 24 and 25, the former of which is disposed on the rear side of the plane in which the screen 13 swings when rotated on its pivot 14. The other finger 25 is offset like the finger 19 illustrated in Fig. 4 (see Fig. 3). In this way a small rectangular socket 26 is formed as illustrated in Fig. 3, which forms a seat for the lower edge of the screen 13 when it is rotated over into this second, set, position, and in this position the horn 16 will project upwardly.

It will be noted that in the position indicated in dotted lines, the area of the horn 16 will be located a considerable distance toward the left, and in a position to intercept illuminating rays from the lamps of approaching cars.

In constructing the bracket, it is desirable to have the socket 26 located far enough away from the pivot 14 to enable the left-hand upper corner 27 to clear the finger 19 as that end of the screen is swung downwardly. However, if the screen is sufficiently flexible, this location of the socket 26 may not be necessary, because in that case, the end of the screen could simply be warped away from the finger 25 to pass it.

While I have illustrated this improvement as applied to a passenger type of steering gear in which the steering column is considerably inclined, the invention may be readily applied also to the steering column of buses and trucks, which are usually in a more upright position. Furthermore, it is not essential to the practice of the invention, that the support for the screen be attached to the steering column, for it is obvious that a bracket could be provided for supporting the screen, that would itself be supported on the car frame at a point near, or on, the dash. Such a bracket supported on the dash, however, should preferably have the features of construction described in connection with the pivotal support and form, for the screen, enabling the screen to be set in a substantially horizontal position as indicated in Fig. 1 for daytime driving, and to enable the screen to be shifted over to an inverted position for night driving, so that the screen would then present a considerable area displaced toward the left, and in a position through which illuminating rays from passing cars would enter.

In Fig. 7 is diagrammatically illustrated the way in which the screen operates to prevent reflected rays from any forward portion of the car from striking the eyes of the driver. In this view the screen 28 has its upper edge 29 sufficiently elevated above the upper edge or forward edge of the steering wheel 30 to insure that a reflected ray indicated by the line 31 will pass back of the wheel at too great an inclination to strike the driver's eyes. In this view, the ray indicated by the line 31, is supposed to be reflected from a polished radiator cap 32.

In Figs. 5 and 6 is illustrated embodiments of the invention which enable a screen such as the screen 13 already described, to be shifted laterally in front of the wheel, and also to be adjusted around a substantially vertical axis. The construction for accomplishing this may be supported from the steering column 33, or from any fixed part of the car, for example, the lower edge of the dash (as will be described later).

In order to enable the screen to be supported from the steering column 33, means is provided which is capable of being clamped or otherwise secured to the steering column. It is understood, of course, that the steering column is a fixed tubular casing for the steering shaft that is mounted in bearings within the same. In order to provide an anchor bracket capable of being readily secured on the steering column, we prefer to employ a metal sleeve 34, having considerable resiliency, for example, composed of a good grade of steel. This sleeve is of considerable length so as to provide means for attaching it to the steering column, and also means for securing the lower end of an arm 35 to it. The upper portion of this sleeve is slit longitudinally, and then opened up so that it presents two side ears or forks 36 that are substantially parallel with each other except upwardly and forwardly from the steering column. In order to break out these two ears from the sleeve 34, it is of course necessary to form a circumferential slit extending along on the forward side of the sleeve for about 180°, and the upper edge of the slit becomes the two lower edges 37 of the ears 36 when the metal is formed out to produce the forks 36. In order to form the lower and rear side of the sleeve 34, the rear side is formed with a longitudinal slit extending upwardly from the lower edge and about half way up the length of the sleeve, and the material is also formed with two short circumferential slits at 38 as illustrated in Fig. 6. This enables the tongues formed in the sleeve below the circumferential slit 38 to bend outwardly to form two ears 39 which extend substantially parallel with each other, and which carry a clamping bolt 40, the fixed head of which seats against the outer side of one of the ears 39, and the other end of which is provided with a wing nut 41 seating against a spring washer 42.

Referring now to the mounting and construction of the arm 35, it should be stated that this is a bifurcated arm in order to give stability to the bracket head or floating bracket 43 that is supported by this arm. That is the reason for bending the ears 36 out, which disposes them further apart and spaces the two forks or side arms 44 of the arm 35. These two forks 44 are adjustable in length, and include rods or stems 44a and tubular members 44b into which the rods 44a telescope. The lower ends of the rods 44a are formed into heads 45 that seat against the outer faces of the ears 36, and which are attached pivotally on the ears 36 by a common bolt 46 that passes through both ears, and the projecting end of which is provided with a wing nut 47. A distance piece or sleeve may be employed on the body of the bolt 46 between the ears if necessary, to reinforce them against the clamping force developed by the wing nut when it is tightened up against the spring washer 48 against which it seats. The upper ends of the tubular sections 44b are closed by fixed plugs or stems 49, the outer ends of which are formed into eyes 50, respectively, that lie in clearance slots 51 formed at the under side of the floating bracket or bracket head 43. A portion 52 of the body of this bracket head lies between the eyes 50 and operates as a spacer for them when their clamping bolt 53 is tightened up by means of a wing nut 54 that is attached to the projecting threaded end of the bolt 53, and which seats against the spring washer 55, similar to the spring washers already referred to.

The floating bracket 43 has a flat upper face on which a guide 56 is mounted for pivotal movement on a substantially vertical axis. For this purpose the underside of the guide 56 is provided with a downwardly extending pivot bolt 57 which extends through an opening drilled in the body of the bracket 43, and the projecting threaded end of this bolt is provided with a nut 58 having a handle 59 for tightening the same against a spring washer 60.

The guide 56 is in the form of an elongated bar that normally extends in a transverse plane at right angles to the fore-and-aft axis of an automobile. On its upper face a carriage 61 is mounted. Preferably these two parts are provided with a dovetailed tongue and groove connection 62 (see Fig. 5) which holds the carriage on the guide, but permits free movement of the carriage along the guide.

The carriage 61 is provided with means for enabling it to stay in any position in which it is put. In other words, I provide a frictional resistance to its sliding movement. This is accomplished by providing an upwardly extending flanged ear 63 on the guide, the flange of which overlies the side edge of the carriage, and on the under side of the flange a leaf spring 64 is attached, the end of which rides frictionally on the upper face of the carriage.

The carriage 61 has an upwardly extending post 65 against the forward face of which a screen 66 seats. This screen is preferably attached to the post by a pivotal connection that enables it to swing on the post on a substantially horizontal axis. This connection is accomplished by means of a through bolt 67 passing through the screen from the forward side, and the rear end of this bolt carries a wing nut 68 seating on a spring washer 69. The left end of the carriage is provided with a rest socket 70 to receive the lower edge portion 71 of the screen that is parallel with its horizontal upper edge 72. When the edge 71 is on its rest socket 70, the screen will be in its horizontal position. The screen can be lifted out of the socket and if made of flexible material, can be warped forward slightly so as to enable the screen to be rotated around through 180° in the manner described in connection with Figs. 1 and 2. When in that position the horn 73 of this screen, which is formed like the horn 16 of the other screen described, will project upwardly toward the left side and be in a position to substantially eliminate glare from lamps of approaching cars on the roadway. This is possible because the lower portion 74 of this screen below the horizontal line 75, is preferably composed of a colored plastic material that is sufficiently dark to substantially eliminate the glare from lamp-light passing through the same.

The portion 76 that lies above the line 75, is preferably of opaque material. In practice, this may be a strip of the same material as the section 74, but darkened to such an extent that it is substantially opaque.

In Fig. 5a I illustrate another embodiment of the invention in which an anchor bracket 77 is provided, which is constructed so as to be attached to the forwardly projecting flange at the lower edge of the dash 78. This anchor bracket has two upwardly inclined arms that support a long wrist pin 79, and this wrist pin performs the function of the bolt 46 illustrated in Fig. 6. In other words, at each end of the wrist pin 79 an arm is attached, corresponding to the arms 44, and intended to perform the same function in the same way.

In Fig. 5a one of the arms 80 is illustrated extending up from the wrist pin 79 toward the point at which a floating bracket such as the bracket 43 would be carried on the two arms 80.

In order to enable the length of the arms or forks 44 to be adjusted, I provide the lower ends of the tubular forks 44b with one or more slots 81, and the ends at which the slots are formed, are provided with pipe threads 82. On these pipe threads knurled collars 83 are mounted, that have pipe threads cut on their upper ends, and evidently when these collars are tightened up, the sections of the end of the tube between the slits will be pressed in and forcibly clamped against the stems or bars 44a.

In both the construction illustrated in Fig. 5, and in Fig. 5a, it will be evident that when not in use, the apparatus supporting the screen can be loosened up at its joints so as to effect the telescoping of the arms or forks 44 to shorten them, and the apparatus can then be folded down on the axis of the long bolt 46 to a position such as that indicated in dotted lines in Fig. 5. In other words, the device can be broken down at its joints and shoved down out of the way so that it will be supported in its folded position on the upper side of the steering column below the wheel. In the form shown in Fig. 5a, the apparatus can be folded down on the axis of the wrist pin 79 so as to be stowed down under the cowl back of the instrument board, or dash.

Having described several embodiments of the invention, it is obvious that the same is not to be restricted thereto, but is broad enough to cover all structures coming within the scope of the annexed claims.

I claim as my invention:

1. In a screen construction for protecting the eyes of the driver of a car, a bracket having means for securing the same to the steering column, a transparent colored panel pivotally supported on said bracket for rotation about a substantially horizontal axis, said bracket including means for supporting the said panel in a position to project above the upper edge of the steering wheel on the steering column, the pivot for said panel being to one side of the vertical center of the panel, said panel having a widened area at one end normally positioned beyond said supporting means, the supporting means including ledges to project under the lower edge of the panel to support the same, said ledges being spaced apart and so located that the end of the panel nearest to the pivot of the panel will clear either of said ledges when the panel is swung on its pivot to bring its widened end to the left of the steering wheel.

2. In a screen construction as provided for in claim 1, in which said ledges are provided at the ends of arms extending laterally from the bracket, the widened end of the panel having a portion extending below one of the ledges in one position of the panel, the widened portion being located above the second ledge in a second position of the panel.

3. In a screen construction for protecting the eyes of the driver of a car, a bracket having means for securing the same to the steering column, said bracket having an upwardly projecting lug to which a transparent panel is pivotally attached, said panel having its said pivot to one side of the vertical center line of the panel thus providing a short end and a long end on the panel, the long end of the panel having a widened end portion, the bracket having a pair of laterally extended arms, each of said arms being provided at its end with a bracket-supporting ledge, the panel engaging with one or the other of said ledges according to its pivotal position, said ledges being spaced apart and so located that the short end of the panel will clear either of the ledges when the panel is rotatively swung on its pivot.

GEORGE I. WAHNISH.

REFERENCES CITED

The following references are of record in the file of this patent:

UNITED STATES PATENTS

| Number | Name | Date |
| --- | --- | --- |
| 936,075 | Armstrong | Oct. 5, 1909 |
| 1,106,485 | Becker | Aug. 11, 1914 |
| 1,313,083 | Geist | Aug. 12, 1919 |
| 1,468,750 | Sechrist | Sept. 25, 1923 |
| 1,534,487 | Banks | Apr. 21, 1925 |
| 1,868,031 | Sudbrink | July 19, 1932 |
| 2,187,027 | Harvey | Jan. 16, 1940 |
| 2,410,171 | Le Lande | Oct. 29, 1946 |

FOREIGN PATENTS

| Number | Country | Date |
| --- | --- | --- |
| 18,502/29 | Australia | Feb. 20, 1929 |
| 220,489 | Great Britain | Aug. 21, 1924 |